May 18, 1937. H. ALFARO 2,080,846
INTERNAL COMBUSTION ENGINE
Filed June 3, 1933 3 Sheets-Sheet 1

INVENTOR.
Heraclio Alfaro
BY
Evans & McCoy
ATTORNEYS.

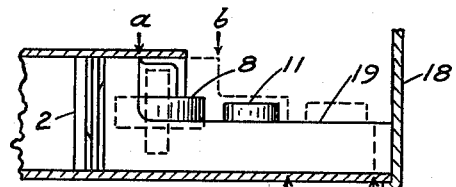
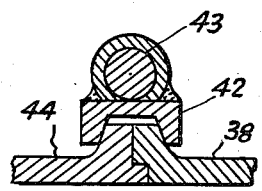
Fig. 6.   Fig. 9.
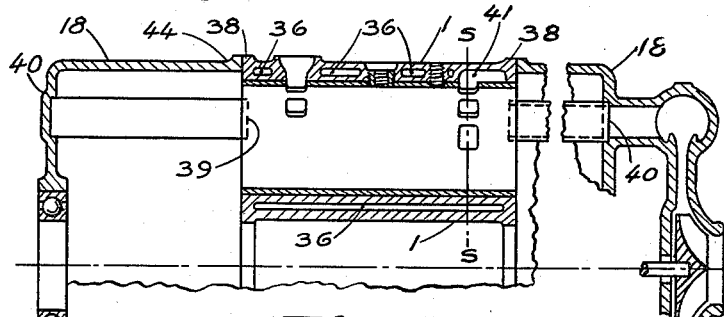
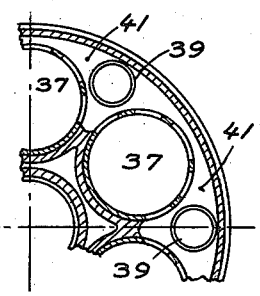
Fig. 7.   Fig. 8.
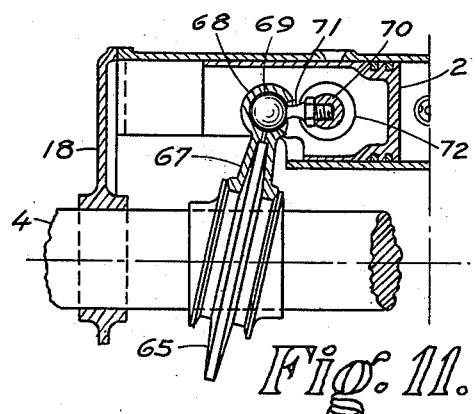
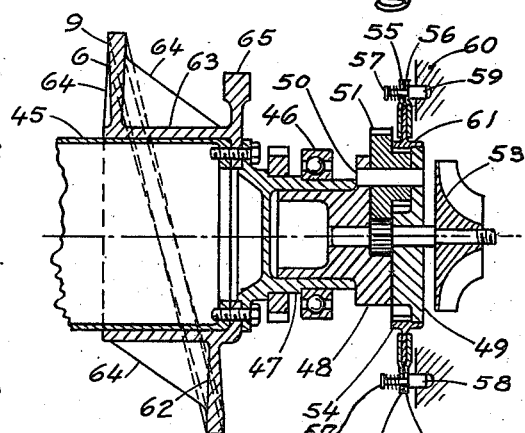
Fig. 11.   Fig. 10.
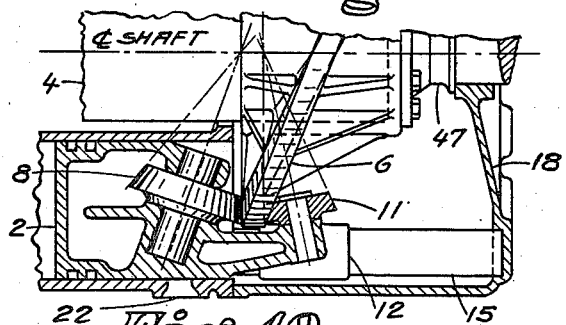
Fig. 12
INVENTOR.
Heraclio Alfaro
BY
Evans & McCoy
ATTORNEYS May 18, 1937.  H. ALFARO  2,080,846
INTERNAL COMBUSTION ENGINE
Filed June 3, 1933  3 Sheets-Sheet 3
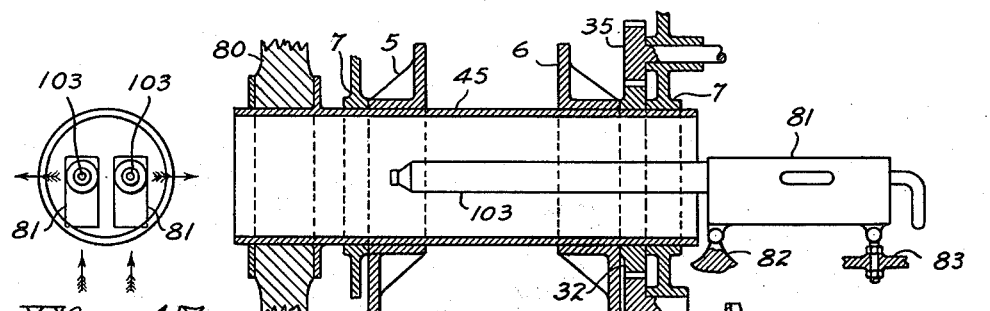
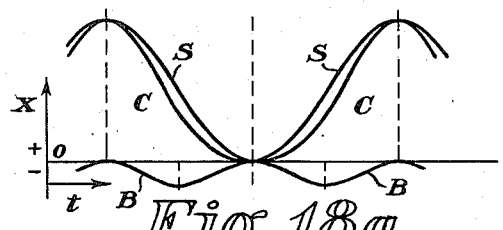
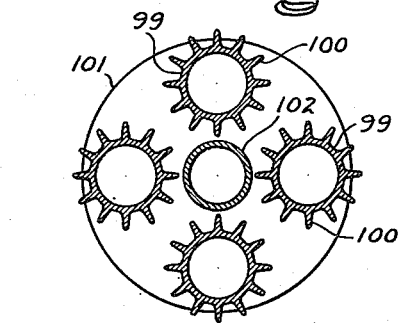
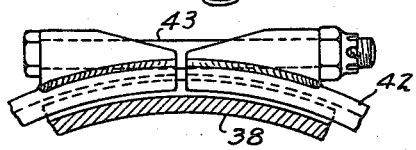
INVENTOR.
Heraclio Alfaro
BY
Evans & McCoy
ATTORNEYS Patented May 18, 1937

2,080,846

UNITED STATES PATENT OFFICE 2,080,846

INTERNAL COMBUSTION ENGINE

Heraclio Alfaro, Cambridge, Mass.

Application June 3, 1933, Serial No. 674,198

29 Claims. (Cl. 123—51)

This invention relates to internal combustion engines and more particularly to barrel or wabbler engines.

An object of this invention is to obtain a light engine for a given horsepower.

Another object is to obtain compactness whereby the "frontal area" may be small.

A further object is simplicity of design and accessibility of all its parts for inspection and servicing.

One more object is low manufacturing cost.

Still another object is greater dependability obtained by reduction in the number of moving parts or parts subject to great temperature or great stresses.

Still a further object is economy of operation.

A further object is to provide a multiple cylinder internal combustion engine in which means is provided for delivering compressed air to the cylinders and also for injecting fuel into the cylinders and to provide means for simultaneously controlling the air compressing and fuel delivery means to regulate the amount of air and of fuel delivered to the cylinders.

It is an object of the present invention to provide a multiple cylinder engine suitable for driving aircraft propellers in which the cylinders are disposed parallel with the propeller shaft and are spaced circumferentially of the shaft in such manner that the cylinders may be air cooled and to provide efficient driving means interposed between the pistons and the drive shaft.

A further object is to provide an aircraft engine having a tubular drive shaft of relatively large diameter which is open at the ends so that one or more machine guns can be mounted with their barrels extending into the tubular shaft making it unnecessary to synchronize the firing mechanism with the propeller.

With the above and other objects in view, the invention may be said to comprise the construction as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 6 is an alternative arrangement of piston.

Fig. 7 shows details of construction of this engine.

Fig. 8 shows also details of construction.

Fig. 9 shows the section of a hoop used in this engine.

Fig. 9a is a fragmentary sectional view showing the hoop in elevation.

Fig. 10 shows an arrangement of shaft, wabbler and air compressor gear in this engine.

Fig. 11 shows an alternate form of construction of the wabbler.

Fig. 12 shows another modification of the means for transmitting the power of the pistons to the engine shaft.

Fig. 13 is a detail view showing a carburetor delivering into the air intake leading to the compressor.

Fig. 14 is a fragmentary view showing an open ended tubular engine shaft adapted to receive the barrels of machine guns.

Fig. 15 is an end elevation of the tubular shaft showing two machine gun barrels side by side therein.

Fig. 16 is a fragmentary detail view showing the mechanism for simultaneously controlling the air compressing and fuel injecting means.

Fig. 17 is a sectional view showing the cylinders of an air cooled engine embodying the invention.

Fig. 18 is a diagram showing the motion which is preferably imparted to each of the pistons.

Fig. 18a is a diagram in which a compound harmonic motion of the pistons is plotted.

Fig. 19 is a diagram in which the out-of-phase motion of the pistons of a cylinder is plotted.

Figures 2, 3:
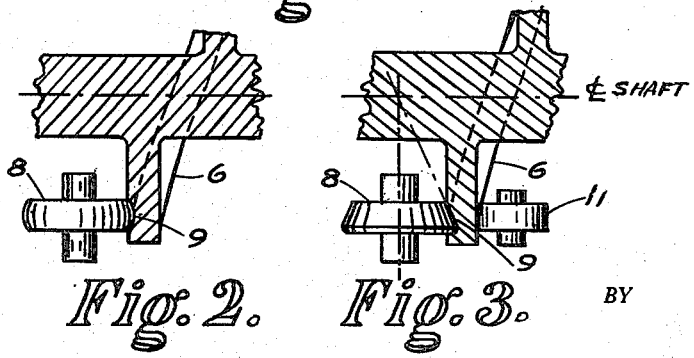
Fig. 2 shows an alternate arrangement to transmit the power of the pistons to the engine shaft.
Fig. 3 is another alternative arrangement.

In the accompanying drawings the cylinder block of the engine is indicated by the reference numeral 1, the pistons by the numeral 2, and the cylinders by the numeral 3. It can be seen that each cylinder has two pistons. The shaft 4 of the engine carries two wabbler plates or cam plates 5 and 6 symmetrically arranged. Bearings 7 support this shaft. Rollers 8 rotate on tenons carried by the pistons 2 and transmit the rotational motions of the wabblers into the reciprocating motion of the pistons and vice versa. Each of the wabblers has a roller way 9 engaged by piston rollers and the shape of this roller way 9 of the wabblers can be any that will impart the desired reciprocating motion to the pistons. It can be grooved as shown in Fig. 2, or tapered, or a combination of taper and groove as in Fig. 3.

Figure 1:
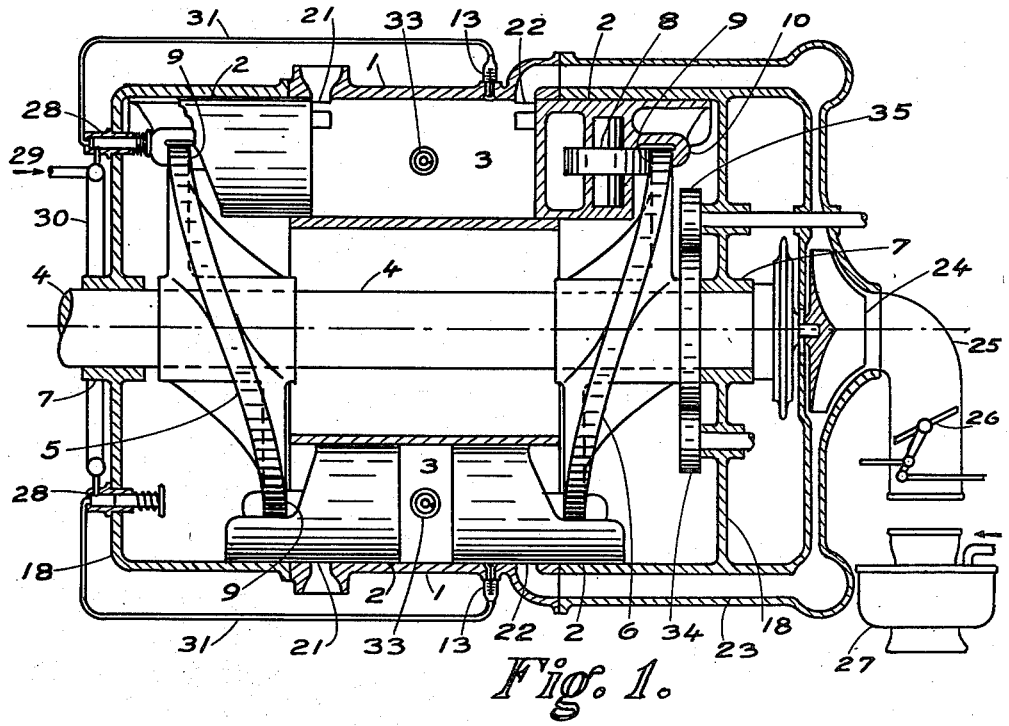
Figure 1 shows a longitudinal cross section of one engine embodying the features of this invention.

The roller ways of the wabblers are preferably of such contour as to maintain line contact with the rollers across the peripheral faces thereof, each roller engaging surface being such as would be generated on a face of a wabbler plate rotating about its axis at a predetermined speed by a generating grinding or cutting element occupying a position corresponding to one of the piston rollers, having a peripheral contour corresponding to that of the roller and reciprocating on a line parallel with the axis of rotation of the wabbler plate with linear movements which the pistons are to have in driving the engine shaft at the said predetermined speed. The relative speeds of movement of the pistons in different portions of their strokes may thus be accurately regulated. The wabbler plates as illustrated in Fig. 1 may be designed to impart simple harmonic or compound harmonic motions to the pistons as will be explained later.

In order to reduce or to eliminate entirely the slippage of the rollers 8 of the pistons against the roller ways 9, said roller can be tapered as shown in Fig. 12 so that its circumference along its line of contact with the roller way varies directly with the distance from the axis of the shaft 4, the roller being tilted relative to the piston to position its line of contact with the wabbler plate across the piston axis and normal thereto so as not to transmit any additional side load to the piston due to the taper. In this case the generation of the roller way 9 must be obtained accordingly. A tapered grinding wheel can be used as the generating element to finish the roller way 9. As the wheel is worn to smaller size, the wheel can be cut down in length so as to fit again the requirement of being of substantially the same in size as the taper roller 8. The service of a grinding wheel can thus be much increased.

In Fig. 11 the type of wabbler shown is particularly suitable for a two-cylinder engine. It consists of an offset disc 65 whose faces can be made slightly conical in shape, a slipper 67 and ball socket 68 where ball 69 lodges. This ball is formed on the end of a link 71 connected to the piston through a cylindrical cross pin 70 provided with flanges 72 which transmit the side loads due to the torque reaction of the wabbler to the piston.

The principle of the transmission of motion shown here can be applied to engines of various types, to four-cycle engines or to engines of the two-cycle variety. Under normal operating conditions the pistons tend always to exert a thrust against the roller way 9 of the wabbler. At very high speeds, however, and under other operating conditions, this tendency may not occur. To avoid separation of the rollers 8 and roller way 9, a follower 10 such as shown in Fig. 1 may be provided. This follower can be replaced by a roller 11 if desired, as shown in Figs. 3 and 12, which may be cylindrical, grooved or tapered as may be necessary to maintain proper contact with face of the wabbler opposite that engaged by the roller 8.

Figures 4, 5:
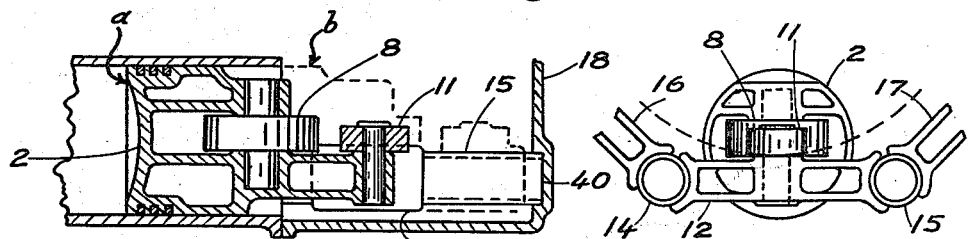
Fig. 4 shows in section a piston and its rollers.
Fig. 5 is an end view of said piston.

When in operation, the wabbler will exert a side central thrust through the piston rollers to the piston at any position except at "dead centers". This side force results in a side load between the pistons and the cylinder walls. It is desirable that means be provided to reduce the friction and wear between the pistons and cylinders. This may be accomplished in various ways, for example, each piston may be provided with a crosshead and slide. Figs. 4 and 5 show such an arrangement. In these figures piston 2 is shown in section and in end view, respectively.

The piston 2 is shown in Fig. 4 in its "top center" position $a$ but is intended to move from $a$ to $b$ positions in accord with the wabbler action. The wabbler should fit between the rollers 8 and 11. Slides 14 and 15 are stationary and are held rigidly between the cylinder block 1 and the wabbler covers or crank case 18 on each side of the block. A crosshead 12 is cast integrally with the piston and is machined to fit on slides 14 and 15. In a multicylinder engine these slides may serve to support the crossheads 16 and 17 of the adjacent cylinders as well, as shown in Fig. 5. In this case there should be as many slides as pistons. Instead of these slides and crosshead, an extension 19 of the cylinders extending past the rollers may serve to align the skirt of the piston as shown in Fig. 6.

As illustrated in Fig. 1, the motion of the pistons uncovers ports 21 for the exhaust and 22 for the intake, so that valves are unnecessary. The intake ports 22 are connected through pipes 23 with a supply of compressed air maintained by any suitable means. An air compressor of the centrifugal type such as that indicated by the numeral 24 may be employed, and this compressor may be driven from one end of the engine shaft through suitable gearing including a slipping clutch. The necessary supply of air could be compressed by extending the length of the cylinder barrels out into the wabbler housings and providing each piston with a head at the end thereof within the extended cylinder which would serve the purpose of the crosshead as well as an air compressing means.

As shown in Fig. 1, air is supplied to the compressor 24 through an inlet pipe 25 which is provided with a throttling valve 26 and which may be connected directly to a carburetor 27 of any suitable type, as shown in Figs. 1 and 13. Instead of using the carburetor 27, the fuel may be injected directly into the cylinders through jets 13. To that end a pump 28 is placed opposite the end of one of the pistons of each cylinder. This pump can be of the regular plunger type using either check valves or masked holes for its valve action. Each fuel pump 28 may be operated by its corresponding piston 2 which imparts the injecting stroke to the pump plunger as it approaches "bottom dead center" of its own stroke. In multicylinder engines it may be advantageous to arrange the fuel injection lines coming from the pumps so that the injection of each pump will act on the next adjacent cylinder or the second next. In this fashion a more suitable fuel timing may be obtained. The fuel supply enters a ring 30 which communicates with each of the pumps 28 through a supply line 29 so that there is a continuous supply of fuel to all the pumps. Each jet 13 is connected to one of the pumps 28 by a pipe 31.

It is of particular importance that the jets or nozzles injecting the fuel into the cylinders should each be placed in a part of the cylinder other than that in which the combustion takes place, in order to avoid carbonization of the jets. This arrangement may be employed when using the Otto cycle, but is particularly desirable in a two cycle engine. In the case of a two cycle engine, it is advantageous to place the fuel jets close to the inlet port and far from the exhaust port so as not to lose fuel during the injection period. Tests will indicate the best location, timing and type of nozzle, etc.

A gear 32 on the shaft 4 serves to drive the engine accessories through pinions 34 and 35. Other gears may be installed at either end of the shaft 4 if necessary.

This type of engine can be made to operate on either the Diesel cycle or the Otto cycle and, in each case, the two stroke or four stroke cycle can be performed. Naturally, the four stroke cycle will require valves at the explosion chamber instead of ports in the cylinder.

In order to improve the efficiency of the intake and exhaust operations, the wabbler or cam plates should be displaced angularly. They should be fixed to the engine shaft with a certain degree of angular asymmetry. This will result in the pistons of each cylinder not moving exactly opposite to each other at the same time. It is better to adjust the angular offset so as to cause the piston of the exhaust side to move slightly ahead of its twin intake side piston.

The operation of this engine as shown in Fig. 1 is as follows: Rotation of wabblers 5 and 6 will result in translation of pistons 2 and vice versa. When pistons 2 are at "bottom center" position ports 21 and 22 are open and the compressed air flows into the cylinder through pipes 23 and ports 22, through the cylinder, and out again through exhaust ports 21. Due to the angular offsetting of the two wabblers, the exhaust side piston closes its port ahead of the intake one. At about that time the neighboring exhaust side piston reaches "bottom dead center" and acts on its corresponding fuel pump sending a jet of fuel into the cylinder. Soon after, intake port 22 closes masked by the piston.

Both pistons proceed toward each other compressing the air and fuel mixture. When near their closest position, a spark jumps at the spark plug indicated by the numeral 33 in Fig. 1. The ignited gases expand and push the pistons away from each other following the cam tracks 9 of the wabblers in their outward movement. Due to the angular offset of the wabblers relative to each other the exhaust side piston reaches its outermost position slightly ahead of the intake piston, and, therefore, the exhaust port opens first relieving the inside pressure. Intake port 22 opens next and admits compressed air which sweeps the residual gases from the cylinder. The cycle repeats itself from then on.

A constructional feature of this engine is the cylinder block 1, shown in Figs. 7 and 8, resembling greatly the barrel of a revolver. It consists of a casting containing the cylinder spaces 37, spaces 36 surrounding each cylinder proper and flanges 38. The cooling fluid is circulated through spaces 36. This fluid can be water or other compound (as glycerin compounds, etc.) with a high boiling point. The cylinder proper can be lined with a sleeve of a different metal of better wearing qualities. This sleeve may be press fitted or shrunk into the cylinder block. Also it can be further secured to the block by the spark plug and fuel jet bushings or by independent bolts. Guides 14 and 15 are tightly secured into recesses 39 and 40 of the cylinder block and of the crank case, respectively. The compressed air enters ports 22 through chambers 41 between cylinders at the intake side. Cylinder block 1 and crank case or wabbler cover 18 are tightly bound together by a hoop 42 shown in section in Fig. 9, and in elevation in Fig. 9a, which can be tightened by bolt 43 drawing its two ends together.

The tension of said hoop will draw flanges 44 and 38 tightly against each other. This feature can be used in other places in the engine and can be equally applied to other types of internal combustion engines especially to the crank cases of radial engines.

Other constructional features are the air compressor gear drive and the shaft and wabbler assembly. As shown in Fig. 10, a shaft 45 carries the wabbler 6 and is supported at one end by a bearing 46 through an axle end 47 which is bolted tightly to both the wabbler 6 and the shaft 45. Blocks 48 and 49 are bolted together and secured to said axle end 47. Between blocks 48 and 49 are held one or more (preferably 3) pins 50, which in turn carry gears 51. These are meshed at one side to a pinion 52 which drives the centrifugal impeller 53, and at the other side to internal gear 54. Said internal gear 54 is held against rotation by plates 55 and 56 through the friction resulting from the pressure of springs 57. When the rotational acceleration of shaft 45 is high or there is rotational vibration, gear 54 slips circularly between plates 55 and 56 avoiding the stripping of the gears. Plates 55 and 56 are kept from rotating by pins 58 which engage in loose recesses 59 of the crank case wall 60. Gear 54 may be guided also by cylindrical lip 61, fitted for free rotation over block 48. Wabbler 6 may be made as shown in Fig. 10 with a helical band 62 united to a cylindrical part 63 and reinforced by ribs 64. Rolling surface 9 can be generated so that opposite faces thereof remain in constant engagement with the rollers 8 and 11 of the pistons. The angular offset of the two wabblers causes some loss of dynamic balance of the engine, but this can be compensated for by placing a counterweight 65 at a suitable point on each wabbler, thereby introducing a restoring dynamic couple.

The wabbler cam can also be built so as to give to the pistons any type of motion that may be desired. For instance, in some cases it may be advantageous to increase the time that the pistons will spend at their outer positions in order to facilitate the exhaust and intake processes. To accomplish this I would shape the cam so as to provide the type of compound harmonic motion desired. To the usual expression for simple harmonic motion $x = r \cos wt$ another term B can be added or subtracted. This term B can be of any suitable form as for instance $r_1 \cos w2t$ which will provide a very desirable type of motion. In the above, $x$ represents the distance traveled by the moving piston from a given datum center at any time $t$; $r$ is the maximum distance at which the moving piston can be from said datum center; $w$ is an expression of the specific angular velocity of the element providing the harmonic motion. It is assumed that said element rotates evenly at a velocity $w$. $r_1$ represents the maximum discrepancy between the "simple" and the "compound" harmonic motions.

Curves are plotted of these expressions as shown in Fig. 18a. The simple harmonic motion curve $x = r \cos wt$ is shown by S. The term B is taken as equal to $r_1 \cos w2t$ for the sake of illustration and is shown by the curve B. The combined value of the two terms $$(x = r \cos wt + r_1 \cos w2t)$$

is represented by the curve C. Since the displacement $x$ of the piston is plotted against time $t$, it can be seen that the compound motion provides a slower velocity to the pistons at one end of their stroke than at the other. As shown in the figure, if the lower values of $x$ represent the outer positions of the piston, this type of motion will provide a greater lapse of time for the exhaust and intake processes. To obtain an equivalent result each wabbler cam may have a short portion thereof which is engaged by the piston roller at the outer end of its stroke disposed substantially normal to its axis of rotation so as to give the piston the desired dwell. In Fig. 18 of the drawings the linear piston displacement is plotted against the angular displacement of the wabbler cam and the piston motion is represented by a curve similar to a sine curve but having flat portions. Also to avoid knocking it may be advantageous to shorten the time that the pistons remain in the inner position. The wabbler cam may also be made to provide more than one complete cycle per revolution. This may be particularly advantageous in a large multicylinder engine where a slow revolving propeller is desirable. Fig. 19 represents the plotted motion of the two pistons of each cylinder when their coacting wabblers are "out of phase" in this figure the times for the exhaust opening (E. O.) and closing (E. C.) and for the intake opening (I. O.) and closing (I. C.) are shown. This figure also shows the exhaust period (a), the scavenging period (b), and the supercharging period (c). These can be altered by changing the value of the factor B of the expression for the compound harmonic motion and also by changing the "out of phase" timing (d) shown in the figure.

It will be noticed that the existence of two wabblers attached to a single shaft and the provision of two pistons per cylinder eliminates the transmission of the gas loads to the bearings as is the case in other engines, also it relieves the cylinder from any axial loads other than friction. This naturally is a contributing factor to lightness and dependability.

In the pistons, it will be noticed there are two side thrust resisting members; one the piston skirt and the other the crosshead slides 14 and 15, Fig. 5. These are placed in the direction of the axis of the piston, at both sides of the roller. This arrangement provides a dependable and stable alignment of the piston when operating with side load.

The combination of an independent compressor and direct fuel injection in a barrel two-cycle engine makes a lighter and more compact engine and increases the volumetric efficiency and dependability. It also improves starting and acceleration. The combining of the intake pipes into the slides of the crosshead and the use of hoops to attach some of the parts simplifies the manufacture and reduces its cost. It also simplifies inspection and servicing.

The fact that the injection nozzles are covered by the piston during most of the combustion period eliminates the chances of trouble due to carbonization of the jets.

In Figs. 14 and 15 two machine guns 81 are shown with their barrels 103 arranged to fire through the engine shaft 45. Said shaft is open at its ends and is of a relatively large diameter throughout its length. This requires an enlargement of the hub carrying propeller 80 and of bearings 7. The arrangement of wabblers 6 remains substantially unchanged. The gear 32 is arranged to drive the engine accessories through the pinion 35. It drives also the impeller 53 of the air compressor through the idler 51 and pinion 52. Trunnions 82 and 83 support the machine guns. Trunnion 83 can be adjusted to the desired firing line as is the usual practice. The cartridge belts may be arranged to travel as shown by the arrows in Fig. 15.

Since the fuel air ratio required by an engine is nearly constant, it is advantageous to have a linkage between the throttle valve 26 (Fig. 1) and the fuel pumps so as to vary both at the same time if desired. The link of the fuel pump will control the stroke of said pump or will act in any other way in which the amount of fuel delivered can be controlled.

Fig. 16 shows one way of obtaining at will independent or simultaneous adjustment of the air and fuel supplied to the engine. The body 28 of the fuel pump carries check valves 98 arranged to supply a flow of fuel as shown by the arrows. Plunger 90 carries two flanges 91 and 93 at its outer end and is acted upon by the piston 2 as previously described. When piston 2 releases its pressure against plunger 90, it is pushed out by a spring 95 until the flange 93 hits against the upper end of an arm 92. The position of the arm 92, therefore, determines how far out plunger 90 is allowed to go. This determines the stroke of the fuel pump and, therefore, its fuel supply.

Control lever 84 governs the air supply through rod 86 and air valve 26 and at the same time controls the fuel supply by changing the position of arm 92 through link rod 88. Thus it can be seen that both air and fuel supplies increase or decrease simultaneously by the motion of lever 84. The position of arm 92 can also be changed by acting on control lever 85 through rod 89. It can be seen that by changing its position from a to b (dotted), arm 92 will pivot about pin 94 and change the allowed stroke of plunger 90. Control lever 85, therefore, governs the fuel supply independently of the action of lever 84.

The body 28 of the pump is attached to the body 18 of the engine proper by threads or other means. The outer end of the pump plunger carries threads on which a bumper 87 is secured. Shims 97 can be interposed between flange 91 and bumper 87 to adjust the length of the stroke accurately. In multicylinder engines where all fuel pumps are expected to operate evenly this individual adjustment of each pump is of importance.

Fig. 17 shows a section of the cylinder block of a barrel engine of this same type in which the cylinders are air cooled. The engine is otherwise in all respects the same as that shown in Fig. 1. It can have any number of cylinders provided there is enough space between them for the air to circulate. Cylinders 99 have fins 100 cast integrally with the cylinder block. The main shaft crosses through passage 102. If necessary baffles can be arranged to direct the cooling air to all points. In this fashion the advantages of air cooling and of compactness can be had at the same time.

In this description and claims, it will be understood that a wabbler cam or wabbler plate, or simply a wabbler, means a member (rotating or stationary) mounted on a shaft to induce reciprocating motion in paths substantially parallel to said shaft. It may be a non-rotating wabbler as shown in Fig. 11 or a camlike wabbler as shown in Fig. 1 without departing from this meaning.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A barrel engine of the two cycle internal combustion variety having a plurality of cylinders substantially parallel to the shaft, a pair of opposed pistons in each cylinder, and a pair of wabblers for imparting a compound harmonic motion to the pistons, said wabblers being shaped so as to provide a faster motion to said pistons when on the inner part of their stroke than when on the outer part of their stroke.

2. In an internal combustion engine, a cylinder, a piston in the cylinder, a "cross head" carried by the piston, a thrust transmitting roller carried by the piston between the cross head and the piston head and means for guiding the cross head.

3. In an internal combustion engine, a cylinder, a piston in the cylinder, a motion transmitting member, a roller carried by the piston for transmitting thrusts to said member, a "cross head" carried by the piston outwardly of the roller, and a follower carried by the piston and engaging the motion transmitting member to prevent separation between the roller and the motion transmitting member.

4. In an internal combustion engine, a cylinder, a piston in the cylinder, a roller carried by the piston for transmitting explosion thrusts, a motion transmitting member engaged by the roller and means carried by the piston at opposite sides of the roller ahead of the roller and to the rear thereof for resisting side thrusts on the piston.

5. A barrel engine having a casing, a pair of wabblers, cylinders spaced circumferentially of the wabblers, opposed pistons in each cylinder, centrifugal air compressing means, and means integral with the casing of the engine for delivering air from said compressing means to the cylinders.

6. A barrel engine of the two-cycle internal combustion variety having a casing, a pair of wabbler elements, cylinders spaced circumferentially of the wabbler elements, two opposed pistons in each cylinder, centrifugal air compressing means, and means integral with the casing of the engine for delivering air from said compressing means to the cylinders.

7. A barrel engine of the two-cycle internal combustion variety, two wabbler elements, cylinders spaced circumferentially of the wabbler elements, opposed pistons in each cylinder, one piston of each cylinder being operatively connected to a wabbler element, centrifugal air compressing means independent of the cylinders and pistons, and means for delivering air from the compressing means to the cylinders.

8. A barrel engine having two wabblers, cylinders spaced circumferentially of the wabblers, opposed pistons in each cylinder, air compressing means for delivering compressed air from said compressing means to the cylinders, means within the cylinder wall for injecting liquid fuel directly into the cylinders, and spark ignition means, said fuel injecting means being located so as to remain covered during the explosion.

9. A barrel engine of the two cycle internal combustion variety having a drive shaft, a plurality of cylinders, two opposed pistons in each cylinder, and means for imparting movements to the pistons such that the pistons will first unmask an exhaust port, then an inlet port, then will mask said exhaust port and then will mask said inlet port, said means comprising cams interposed between opposed pistons and the drive shaft, said cams having angularly offset and substantially flat portions for causing retardation of the normal motion of the pistons at the end of each power stroke.

10. In internal combustion engines having a plurality of cylinders, a fuel supply system consisting of a direct injection pump for each cylinder comprising a plunger outside the combustion chamber which is actuated directly by one of the gas driven pistons of the engine during the stroke thereof.

11. A barrel engine having two wabbler cams, cylinders spaced circumferentially of the wabbler cams, two opposed pistons in each cylinder, and a fuel pump on each cylinder acted upon by one of the pistons therein.

12. A barrel engine with two wabbler cams, cylinders spaced circumferentially of the wabbler cams, two opposed pistons in each cylinder, one of which coacts with one wabbler cam and the other with the other wabbler cam, a fuel pump on each cylinder connected to a cylinder for direct injection of fuel thereinto and actuated by one of the pistons, and means to change the amount of fuel injected simultaneously with changing the amount of air supplied.

13. A barrel engine of the two cycle internal combustion variety having a plurality of cylinders, two opposed pistons in each cylinder, a cross head attached to each piston, hollow guides upon which the cross heads of the pistons slide, said hollow guides serving also as ducts to convey the supply of air to the cylinders.

14. An internal combustion engine having a cylindrical casing, said casing comprising sections abutting end to end, circumferential outwardly projecting flanges on the abutting ends of said sections, and a contractible hoop having an interior tapering channel to receive said flanges, and means for tightening said hoop.

15. In an internal combustion engine having a cylinder with two opposed pistons therein, a jet for direct fuel injection into the cylinder between said pistons, said jet being so placed that it remains covered during the explosion.

16. In a two cycle internal combustion engine having a cylinder with two opposed pistons therein, a jet for direct fuel injection into the cylinder between the pistons, said jet being so placed that it remains covered during the explosion.

17. In barrel engines of the two cycle internal combustion variety, a cylinder block with a cooling jacket, circumferentially spaced cylinders, ports for intake and exhaust in each cylinder, a fuel jet in each cylinder, an axially disposed shaft carrying two wabbler cams, two opposed pistons in each cylinder, a cross head on each piston and a wabbler engaging roller carried by each piston between the head thereof and its cross head, and means for delivering compressed air and fuel to each cylinder.

18. In a barrel engine, a drive shaft comprising a cylindrical member having a wabbler and an axle extension bolted together and to the cylindrical member at each end thereof.

19. In a barrel engine, a cylindrical member carrying two wabblers and two axle ends bolted at each end of said cylindrical member, a planetary gear mounted at one of said axle ends, and a centrifugal air compressor driven through said planetary gear.

20. A barrel engine of the two cycle internal combustion variety having two wabblers, cylinders angularly spaced with respect to the wabblers, two opposed pistons in each cylinder, centrifugal air compressing means, means integral with the casing of the engine for delivering air from the compressing means to the cylinders, and means for injecting fuel directly into the cylinders.

21. In an internal combustion engine, an explosion chamber, means for delivering scavenging air to said chamber, means for delivering fuel to said chamber including a fuel pump of the plunger type, means for operating said pump, means for simultaneously varying the volume of fuel delivered by said pump to said chamber and the volume of scavenging air delivered to said chamber, and independent means to control the fuel air ratio.

22. In a multicylinder internal combustion engine, a fuel pump of the plunger type connected to each cylinder, means for operating the pumps in timed relation to the pistons of the cylinders, means for delivering scavenging air to the cylinders, means for simultaneously controlling the amount of fuel and air delivered to the cylinders, independent means for controlling the fuel charges independently of the scavenging air, and means for adjusting the delivery of each fuel pump independently.

23. An internal combustion engine having a drive shaft, a cylinder, opposed pistons in the cylinder and movement correlating means comprising a pair of cam surfaces, including a substantially flat portion on each cam interposed between said shaft and piston, thus causing a simultaneous retardation in the normal motion of each piston at the end of each power stroke.

24. An internal combustion engine having a driveshaft, a cylinder, substantially parallel to said shaft, two pistons in said cylinder, means including wabbler cams interposed between the pistons and the shaft for correlating movements of rotation of the shaft with linear movements of the pistons and for holding the pistons stationary during a period of time common to both pistons.

25. A barrel engine of the two cycle internal combustion variety having a plurality of cylinders, two opposed pistons in each cylinder, and two wabblers coacting with the opposed pistons of each cylinder and angularly offset relatively to each other so as to obtain asymmetrical movements of the pistons in each cylinder, the engaging surface of said wabblers being shaped to provide a faster motion to said pistons when in the inner part of their stroke than when in the outer part of their stroke.

26. An internal combustion engine, an explosion chamber, means to inject fuel and air during the same stroke to said chamber before the mixture reaches a self-igniting temperature, means for delivering fuel to said chamber including a fuel pump of the plunger type, means for operating said pump, means for simultaneously varying the volume of fuel delivered by said pump to said chamber and the volume of air delivered to said chamber, and independent means to control the fuel air ratio.

27. In a multi-cylinder internal combustion engine, a fuel pump of the plunger type connected to each cylinder, means for operating the pumps in timed relation to the pistons of the cylinders, means to inject fuel and air during the same stroke to each cylinder before the mixture reaches self-igniting temperature, means for simultaneously controlling the amount of fuel and air delivered to the cylinders, independent means for controlling the fuel charges independently of the air, and means for adjusting the delivery of each fuel pump independently.

28. A barrel engine with two wabbler cams, cylinders spaced circumferentially of the wabbler cams, two opposed pistons in each cylinder, one of which coacts with one wabbler cam and the other with the other wabbler cam, and a fuel pump on each cylinder connected to a cylinder for direct injection of fuel thereinto and actuated by one of the pistons.

29. In barrel engines of the two cycle internal combustion variety, a cylinder block with a cooling jacket, circumferentially spaced cylinders, ports for intake and exhaust in each cylinder, a fuel jet in each cylinder, an axially disposed shaft carrying two wabbler cams, two opposed pistons in each cylinder, and a cross head on each piston and a wabbler engaging roller carried by each piston between the head thereof and its cross head.

HERACLIO ALFARO.